United States Patent
Barness et al.

(10) Patent No.: US 8,522,193 B2
(45) Date of Patent: Aug. 27, 2013

(54) PROGRAM DEVELOPMENT TOOL CONFIGURED TO COMPILE SOURCE CODE ACCORDING TO ENERGY CONSUMPTION REQUIREMENTS

(75) Inventors: Eric L. Barness, Pine Island, MN (US); David L. Darrington, Rochester, MN (US); Amanda Peters, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 12/368,758

(22) Filed: Feb. 10, 2009

(65) Prior Publication Data

US 2010/0205578 A1 Aug. 12, 2010

(51) Int. Cl.
*G06F 9/44* (2006.01)

(52) U.S. Cl.
USPC ............ 717/100; 717/104; 717/125; 717/127

(58) Field of Classification Search
None
See application file for complete search history.

(56) References Cited

U.S. PATENT DOCUMENTS

| | | | | |
|---|---|---|---|---|
| 7,080,267 B2 * | 7/2006 | Gary et al. | | 713/300 |
| 7,127,594 B2 * | 10/2006 | Sasagawa | | 712/229 |
| 7,949,992 B2 * | 5/2011 | Andreev et al. | | 717/104 |
| 8,117,587 B1 * | 2/2012 | Testardi | | 717/100 |
| 8,316,343 B2 * | 11/2012 | Birze et al. | | 717/100 |
| 2003/0191976 A1 * | 10/2003 | Cyran et al. | | 713/340 |
| 2005/0223363 A1 * | 10/2005 | Black-Ziegelbein et al. | | 717/127 |
| 2006/0156274 A1 * | 7/2006 | Andreev et al. | | 717/100 |
| 2006/0248501 A1 * | 11/2006 | Andreev et al. | | 717/100 |
| 2010/0205591 A1 | 8/2010 | Barsness et al. | | |
| 2010/0235815 A1 * | 9/2010 | Maybee et al. | | 717/125 |

OTHER PUBLICATIONS

Texas Instruments, Analyzing Target System Energy Consumption in Code Composer Studio IDE, 2002, 13 pages, <http://www.ti.com/lit/an/spra074a/spra074a.pdf>.*
Singh et al., DynaMetrics: a runtime metric-based analysis tool for object-oriented software systems, Oct. 2008, 6 pages.*
Lee et al., Energy-optimized image communication on resource-constrained sensor platforms, Apr. 2007, 10 pages.*
Texas Instruments Incorporated, Code Composer Studio Getting Started Guide, 2001, 131 pages.*
Bleakley, C.J. et al., PowerComposer Demo—Software-level Power Estimation for TI C5510 DSPs, Presented Papers: Dr. Chris Bleakley B.Sc., Ph.D.: UCD CASL Complex & Adaptive Systems Laboratory, 2007, <http://www.ucd.ie/casl/people/principalinvestigators/bleakleychris/>.
Zambreno, Joseph Anthony, Enhancing Compiler Techniques for Memory Energy Optimizations: A thesis submitted in partial fulfillment of the requirements for the degree of Master of Science, Jun. 2002, Northwestern University Press, Evanston, United States.

* cited by examiner

*Primary Examiner* — Thuy Dao
(74) *Attorney, Agent, or Firm* — Patterson & Sheridan LLP

(57) ABSTRACT

Embodiments of the invention provide techniques for presenting energy consumption information in an IDE tool. In one embodiment, the IDE tool may be configured to determine energy requirements associated with specific elements of the source code, and to present graphical indications of energy requirements along with those code elements. Such energy requirements may be determined by matching code elements to a stored data structure describing energy requirements for executing various code elements. The stored data may be based on predefined standards, and/or may be based on historical measurements of energy consumption during prior instances of executing code elements on a target computer system. Additionally, developers may specify priority for compiling portions of source code, according to desired energy requirements.

20 Claims, 5 Drawing Sheets

FIG. 2

```
IDE - SAMPLEPROGRAM.JAVA 0010    void SampleProgram (String last_name) {
0020        // get the initial JDNI naming context
0030        Context ctx = new InitialContext();
0040        // Get the DataSource object associated with the logical name
0050        // "jdbc/myDB" and use it to obtain a database connection
0060        DataSource ds = (DataSource) ctx.lookup("jdbc/myDB");
0070        Connection con = ds.getConnection("user","pwd");
0080        Statement stmt = con.createStatement(ResultSet.CONCUR_UPDATATABLE);
0090        ResultSet rs = stmt.executeQuery("SELECT NAME FROM PERSONNEL");
0100        // rs will be updatable
0110        String s = rs.getString("NAME"); // retrieves the
0120        // NAME column value for row 1 (first name)
0130        String full_name = last_name + ", " + s;
0140        rs.updateString("NAME", full_name);
0150        // update the NAME column for row 1 with full name
0160        rs.updateRow(); // updates the row in the data source
0170        con.close
0180    }
```

PROGRAM DEVELOPMENT TOOL CONFIGURED TO COMPILE SOURCE CODE ACCORDING TO ENERGY CONSUMPTION REQUIREMENTS

BACKGROUND OF THE INVENTION

1. Field of the Invention

Embodiments of the invention are related to tools used to develop application software. More specifically, embodiments of the invention provide techniques for presenting energy consumption information in a program development tool.

2. Description of the Related Art

An integrated development environment (IDE) tool is a programming tool for developing software applications. Typical IDE tools allow a developer to create and edit program source code. Further, IDE tools may provide a developer with a variety of feedback and assistance during the programming process. For example, an IDE tool may identify how different parts of the program source code (e.g., classes, methods, routines, functions, etc.) are used, how such parts interact, how they may be tested, and the like.

A software developer may use an IDE to compose source code for a software application. For example, an IDE may be configured to use the high-level programming languages such as Java, C++, Basic, and the like. The IDE may then be used to compile the source code into object code. Optionally, the object code may be linked with static libraries to produce an executable program.

SUMMARY OF THE INVENTION

Embodiments of the invention provide techniques for presenting energy consumption information in a program development tool. One embodiment of the invention includes a method for presenting source code of a software application. The method may generally include identifying one or more elements of the source code, estimating an expected energy requirement for executing each of the one or more elements of the source code, and displaying, on an output device, one or more indications of the estimated energy consumption requirements.

Another embodiment of the invention includes a computer-readable storage medium containing a program, which, when executed performs an operation for presenting source code of a software application. The operation may generally include identifying one or more elements of the source code, estimating an expected energy requirement for executing each of the one or more elements of the source code, and displaying, on an output device, one or more indications of the estimated energy consumption requirements.

Still another embodiment of the invention includes a system having a processor and a memory containing a program, which when executed on the processor is configured to perform an operation for presenting source code of a software application. The operation may generally include identifying one or more elements of the source code, estimating an expected energy requirement for executing each of the one or more elements of the source code, and displaying, on an output device, one or more indications of the estimated energy consumption requirements.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates an example screen display generated by an integrated development environment (IDE), according to one embodiment of the invention.

DETAILED DESCRIPTION OF THE PREFERRED EMBODIMENTS

Figure 1:
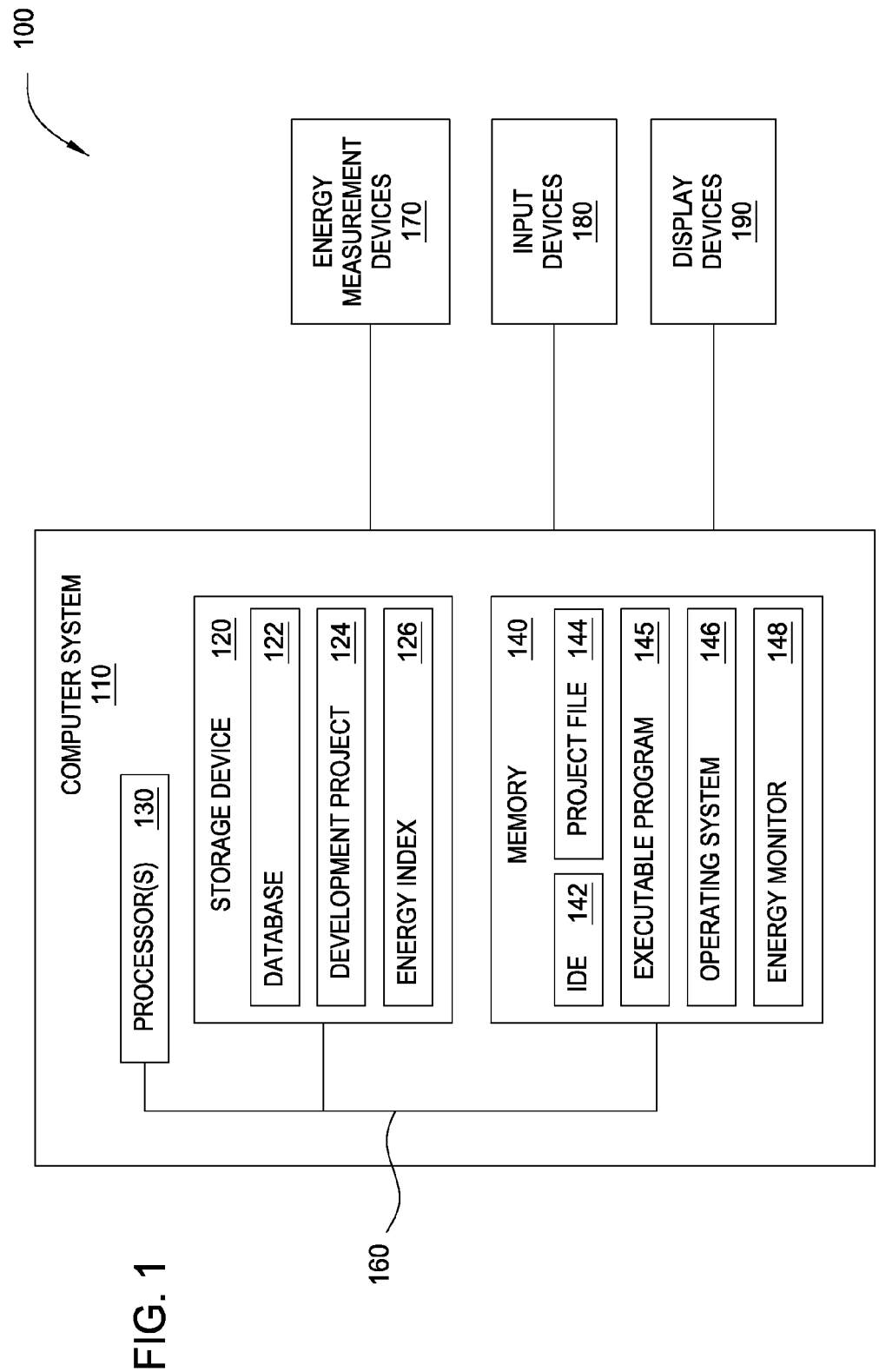
FIG. 1 is a block diagram that illustrates an example view of a computing environment, according to one embodiment of the invention.

Developers frequently use an integrated development environment (IDE) tool to compose source code for software applications, and an IDE tool may include features for authoring, modifying, compiling, analyzing, deploying and debugging source code. While coding an application, developers make coding decisions to ensure that the finished application performs required functions. Further, the developer may make decisions in light of performance considerations, such as memory requirements, speed of execution, bandwidth requirements, and the like. However, current IDE tools do not enable developers to consider energy consumption data for programs or program elements.

Embodiments of the invention provide techniques for presenting energy consumption information in an IDE tool. In one embodiment, the IDE tool may be configured to determine energy requirements associated with specific elements of the source code, and to present graphical indications of energy requirements along with those code elements. Such energy requirements may be determined by matching code elements to a stored data structure describing energy requirements for executing various code elements. The stored data may be based on predefined standards, and/or may be based on historical measurements of energy consumption during prior instances of executing code elements on a target computer system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s).

Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, one embodiment of the invention is described herein relative to an IDE tool used to develop software applications using the Java® programming language. One of ordinary skill in the art will readily recognize, however, that embodiments of the invention may be adapted for use with a wide variety of programming languages and techniques.

FIG. 1 is a block diagram illustrating an example computing environment 100, according to one embodiment of the invention. As shown, computing environment 100 includes computer system 110. Computer system 110 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 110 is simplified to highlight aspects of the present invention and that computing systems and data communication networks typically include a variety of additional elements not shown in FIG. 1.

As shown, computer system 110 includes a processor (or processors) 130, a storage device 120, and a memory 140, all connected by a bus 160. CPU 130 is a programmable logic device that executes user applications (e.g., an IDE tool 142). Computer system 110 may be connected to one or more energy measurement devices 170, a display device 190 and one or more input devices 180. Typically, user input devices 180 include a mouse pointing device and a keyboard, and display device 190 may be a CRT monitor or LCD display. The computer system 110 may be connected to a data communications network (not shown), including both wired and wireless networks. For example, computer system 110 may be connected to the Internet.

Storage device 120 stores application programs and data for use by computer system 110. Typical storage devices include hard-disk drives, flash memory devices, optical media, network and virtual storage devices, and the like. As shown, storage device 120 contains a database 122, a development project 124, and an energy index 126. Database 122 may store a collection of data records organized according to a relational schema (e.g., a structure of tables, columns, and keys for organizing data), and may be accessed using, e.g., SQL database statements. These components of the database schema are generally referred to herein as database elements.

The development project 124 represents a collection of data used to build a software application. For example, development project 124 may include source code files, scripts, etc., along with resources such as fonts, images, build-instructions (make files), and project documentation, etc. Typically, a user (i.e., a developer) may manage files of the development project 124 by using application programs and data files loaded in memory 140.

In one embodiment, e.g., memory 140 includes an integrated development environment (IDE) 142, a project file 144, an executable program 145, an operating system 146, and an energy monitor 148. The operating system 146 may manage the processing activity and hardware resources on computer system 110. For example, operating system 146 may represent the Windows® operating system, distributions of the Linux® operating system, and IBM's AIX and OS/2® operating systems, among others. (Linux is a trademark of Linus Torvalds in the US, other countries, or both).

In one embodiment, the IDE 142 provides a programming environment that assists a computer programmer in developing software applications. The IDE 142 may include a source code editor, a compiler and/or interpreter, build-automation tools, and a debugger (not shown). Other components provided by IDE 142 may include a version control system, a class browser, an object inspector and, a class hierarchy diagram generator, and a variety of other utilities.

The project file 144 may represent a file included in development project 124 that is being edited by a developer using IDE 142, e.g., a source code file of a software application. The IDE 142 may display the text of the source code to the developer on display device 190 and provide an interface that allows the user to edit project file 144. The IDE 142 may be used to compile the project file 144 into the executable program 145, which may be executed on computer system 110 or on another computer system (not shown). One embodiment of IDE 142 is illustrated in FIG. 2, described in greater detail below.

The energy index 126 may be a data structure describing energy requirements of executing specific elements of program code. In one embodiment, the energy index 126 may include records linked to various elements of source code or object code. For example, each record may include a unique identifier for a code element, keywords included in a code element, functionality performed by a code element, a type of code element, and the like. Further, each record may include data describing the electrical energy expected to be consumed by a given computer architecture in executing the corresponding code element. More specifically, each record may include, either separately or in combination, an amount of electricity expected to be required to power the processor 130, to spin a hard drive (i.e., storage device 120), to power cooling fans, send and/or receive data communications and the like. Alternatively (or additionally) the energy index 126 may describe an expected amount of thermal energy (i.e., heat) generated by a given computer architecture in executing program code.

In one embodiment, the energy index 126 may be predefined based on standardized executions of specific code elements (e.g., classes, methods, routines, functions, etc.) on a particular target architecture. Note, however, the energy index 126 may be defined in terms of elements of source code (i.e., project file 144), elements of object code (i.e., executable program 145), or both. Such energy index 126 may be provided by a supplier of IDE tool 142, by a supplier of a computer system on which the program will be executed, and the like.

In another embodiment, the energy index 126 may be generated based on actual energy consumption measured during program execution on an end-use computer system. For example, the energy measurement devices 170 (e.g., a wattmeter) may be configured to measure electrical energy consumed by the computer system 110 at various points in time. Such measurements may be measured for the computer system 110 as a whole, or may be measured for individual components such as processor 130, storage device 120, memory 140, cooling devices, network devices, and the like. The energy monitor 148 may be a software application configured to interface with the energy measurement devices 170 to monitor the electrical energy consumed during execution of the executable program 145 on the computer system 110 or on another computer system (not shown).

Of course, it is anticipated that the energy measurement devices 170 and/or the energy monitor 148 may also function based on other techniques. For example, the energy measurement devices 170 may be configured to measure the thermal energy produced by the computer system 110 during operation (e.g., thermometer, thermocouple, etc.), and the energy monitor 148 may be configured to estimate energy consumed by the computer system 110 based on such thermal measurements. One embodiment of a method for generating energy index 126 based on actual energy consumption is described below with reference to FIG. 4.

In yet another embodiment, the energy index 126 may initially include predefined data based on standardized executions of specific code elements, and may be subsequently updated based on actual energy consumption measured during program execution on an end-use target architecture. For example, the energy index 126 may be initially provided by a supplier of IDE tool 142 with general information regarding energy consumption for particular processor types and other hardware. Such information may be updated by the energy monitor 148 based on energy consumed during execution of the executable program 145 on the computer system 110.

FIG. 2 illustrates an example screen display generated by IDE 142, according to one embodiment of the invention. In this example, IDE 142 displays program source code 200 that includes database statements embedded within source code 200. As shown, source code 200 is displayed with a set of line numbers 210 and a set of program statements 220 for a Java® method named "SampleProgram," representing an example of the project file 144. In this example, source code 200 includes program statements for opening and closing database resources (e.g., database connections, database query result accessors, and the like). For example, lines 0060 and 0070 are program statements that open a database connection to the database "myDB" using the "connection" object named "con." The connection "con" to the "myDB" database is closed by the program statement in line 0170. Line 0160 includes the command "updateRow," which performs an update to the database. In addition, source code 200 may include program statements for processing data and/or variables. For example, line 130 is a program statement for populating the string variable "full_name."

Figure 4:
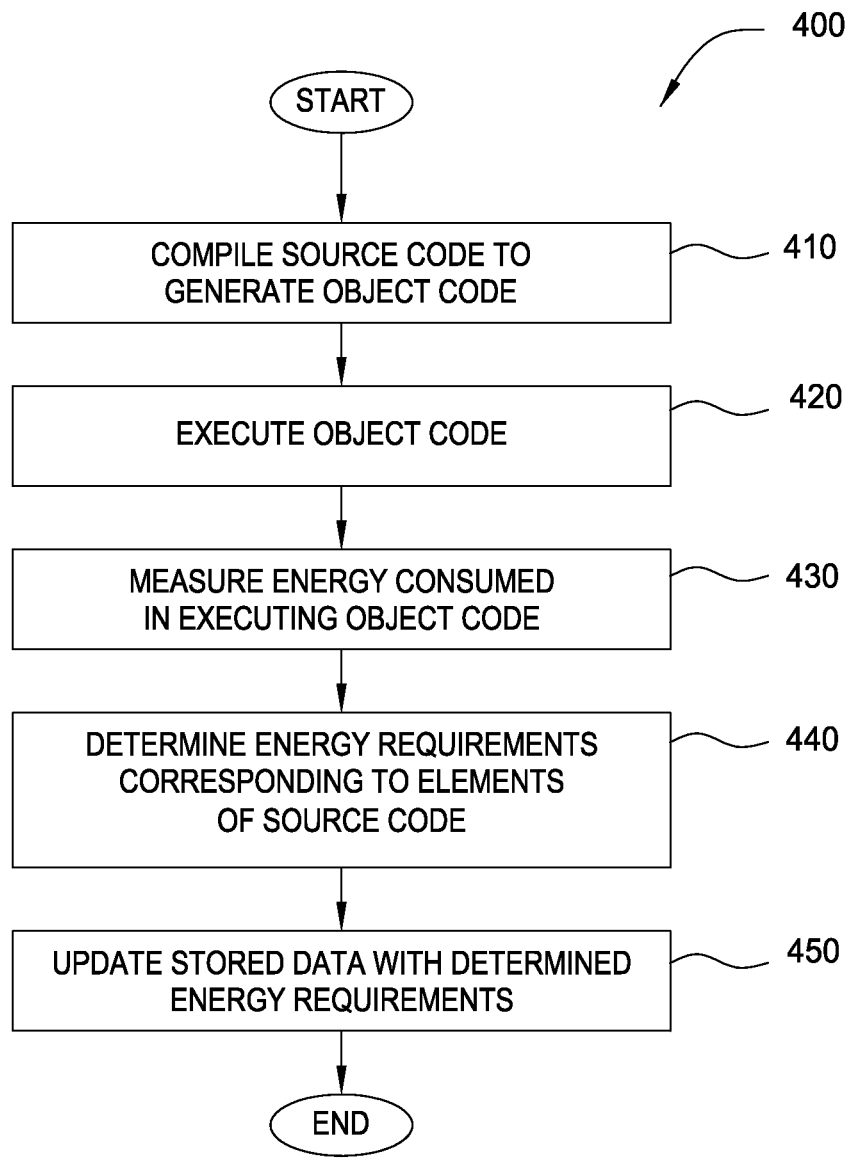
FIG. 4 illustrates a method for generating expected energy requirements data based on previous energy requirements, according to one embodiment of the invention.

In one embodiment, the IDE 142 may be configured to determine energy requirements associated with specific elements of the source code 200, and to present indications of energy requirements along with those elements. For example, the IDE 142 may match a code element to records included in the energy index 126. Such matching may be performed by matching unique identifiers for code elements, keywords included in the code elements, functionality performed by the code elements, types of code elements, and the like. Upon matching a current code element to a record in the energy index 126, the IDE 142 may retrieve data describing energy requirements associated with executing the current code element (for one or more different target architectures). FIG. 4, discussed below, illustrates an embodiment of a method for generating the energy index 126.

Indications presented in IDE 142 may be graphical indications, and may be associated with different elements of the source code 200 such as code lines, classes, methods, routines, functions, and the like. Such indications may provide a developer with information of the impact on the energy expected to be consumed (or heat expected to produced) by various coding decisions. For example, in a situation that the developer may use two different algorithms to compose the source 200, the developer may choose the algorithm requiring less energy to execute. However, if the user is composing a section of code where time performance is critical (i.e., the program must execute as quickly as possible), the user may choose to use an algorithm that is faster but less energy efficient than another algorithm. In either case, however, the developer may use the IDE 142 to weigh alternative coding decisions to balance time performance and energy requirements. One embodiment of a method for presenting present indications of energy requirements in IDE 142 is described below with reference to FIG. 3.

In one embodiment, the IDE 142 may be configured to show portions of source code 200 with various shades of highlighting, indicating the relative degree of energy requirements of each portion. In the example illustrated in FIG. 2, assume that lines of code having a darker highlighting will require more energy to execute than lines having lighter highlighting. Thus, since line 0060 has a dark highlight 230 and line 0090 has a medium highlight 240, the developer using IDE 142 may determine that line 0060 will require more energy to execute than line 0090. Similarly, since line 0130 has a light highlight 250, the developer may determine that line 0130 will require less energy to execute than line 0090.

Of course, the embodiment shown in FIG. 2 is provided as an example, and is not intended to be limiting of the invention. Other embodiments are contemplated, and are thus considered to be within the scope of the invention. For example, IDE 142 may present other types of indications of energy requirements, such as text labels, font effects, symbols, color coding, and the like. Further, IDE 142 may present energy requirements for different levels of granularity, e.g., in contrast to the indications provided by highlights 230, 240, 250, regarding individual lines of source code, the IDE 142 may present a composite of expected energy requirements at different logical programming levels e.g., an individual loop, method, class, interface, etc. Thus, the energy requirements for executing the complete SampleProgram method displayed as source code 220 could be presented. Further still, IDE 142 may analyze a selected program (e.g., the program represented by source code 200) and provide a summary detailing expected energy requirements to execute the code and/or heat generated by executing the code on one or more target architectures.

Figure 3:
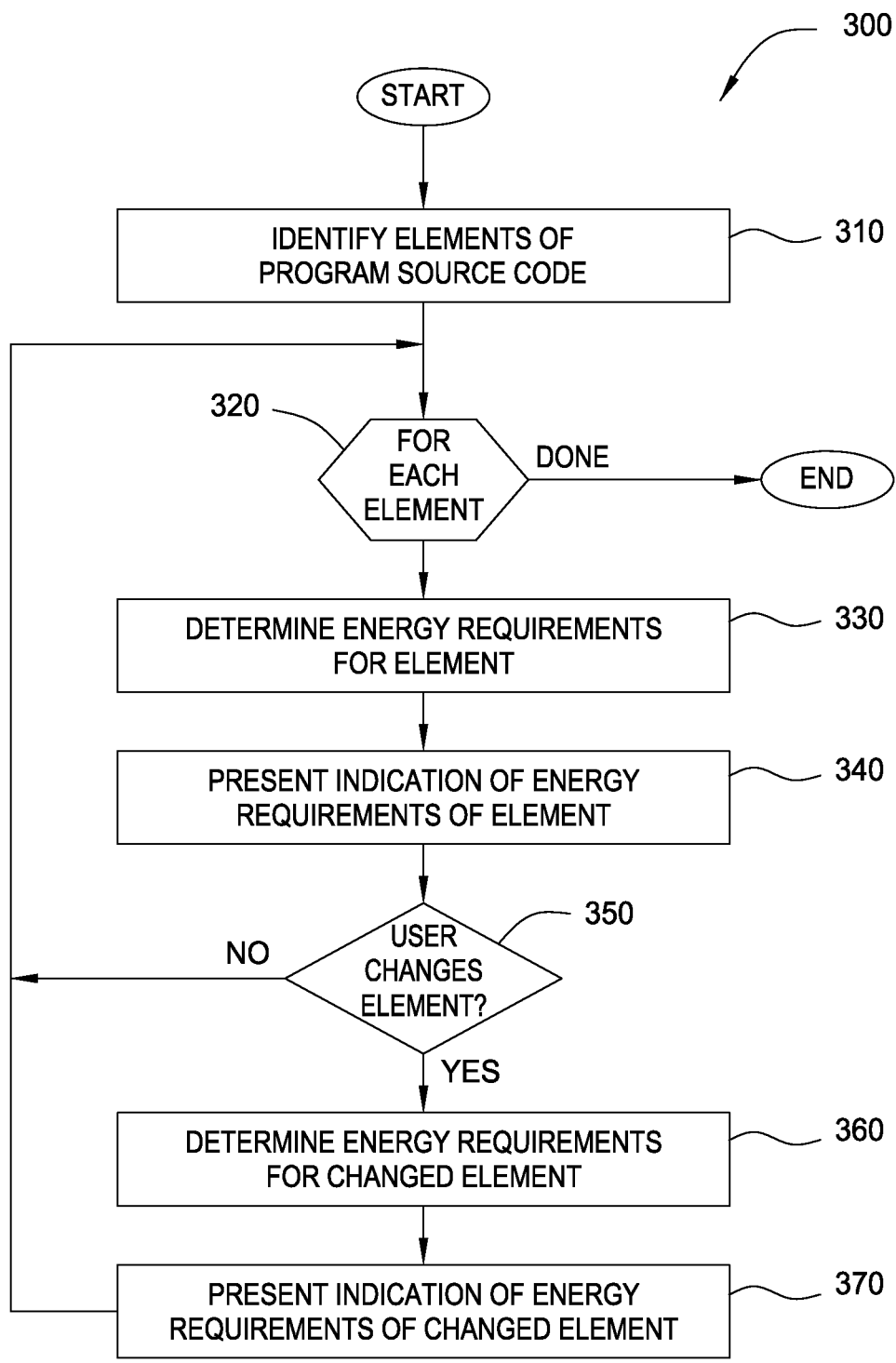
FIG. 3 illustrates a method for presenting indications of energy requirements of source code in an IDE, according to one embodiment of the invention.

FIG. 3 illustrates a method 300 for presenting indications of energy requirements of source code in an IDE tool, according to one embodiment of the invention. Persons skilled in the art will understand that, even though the method is described in conjunction with the system of FIG. 1, any system configured to perform the steps of method 300, in any order, is within the scope of the present invention.

As shown, method 300 begins at step 310, where elements of program source code may be identified. For example, IDE tool 142 illustrated in FIG. 1 may be configured to present lines of the source code 200 (e.g., program lines 0010-0180 illustrated in FIG. 2). Optionally, the IDE 142 may identify elements of source code 200 at other levels, including classes, methods, routines, functions, etc.

At step 320, the method 300 enters a loop (defined by steps 320, 330, 340, 350, 360, and 370) for processing each code element identified at step 310. At step 330, the amount of energy required for executing a current code element may be determined. For example, referring to FIG. 1, the IDE 142 may match the current code element to code elements described by records included in the energy index 126. Upon matching the current code element to a record in the energy index 126, the IDE 142 may retrieve data describing energy requirements associated with executing the current code element. One embodiment of a method for generating the energy index 126 is described below with reference to FIG. 4.

At step 340, the IDE 142 may present the code element along with an indication communicating the energy requirements expected to be required in order to execute that code element. For example, as illustrated in FIG. 2, the IDE 142 may present the lines of source code 200 with various shades of highlighting (e.g., line 0060 shown with highlight 230) indicating the relative degree of energy requirements for each line. Optionally, the IDE 142 may present code elements with other types of indications (e.g., text labels, font effects, symbols, color coding, etc.).

At step 350, it may be determined whether a user of the IDE 142 has changed the current code element. If not, the method 300 returns to process the next code element at step 320. However, if the user has changed the current code element, then the IDE 142 may determine the energy requirements for executing the changed code element (step 360). At step 370, the IDE 142 may present the changed code element along with an indication communicating the determined energy requirements for executing that changed code element. For example, referring to FIG. 2, assume the user of IDE 142 changes line 0130 of source code 200. Assume further that, due to the change, more energy is required (or more heat will be generated) executing line 0130. Thus, the IDE 142 may present the changed line 0130 with highlight 250 being a darker shade than before the change (or otherwise indicate how the change impacts expected energy consumption). Once each element of program source code has been evaluated (step 320), the method 300 terminates.

FIG. 4 illustrates a method 400 for generating expected energy requirements data based on previous energy requirements, according to one embodiment of the invention. Persons skilled in the art will understand that, even though the method is described in conjunction with the system of FIG. 1, any system configured to perform the steps of method 400, in any order, is within the scope of the present invention.

As shown, method 400 begins at step 410, where source code is compiled to generate object code. For example, a developer may use using IDE tool 142 to compile source code in the project file 144 (e.g., source code 200 illustrated in FIG. 2) to generate the executable program 145. At step 420, the object code may be executed. For example, referring to computer system 110, the processor 130 may execute the executable program 145 present in memory 140.

At step 430, the energy consumed in executing the object code may be measured. For example, the energy monitor 148 may interact with the energy measurement devices 170 to monitor the electrical energy consumed during execution of different portions of the executable program 145. Optionally, the amount of energy consumed in executing the object code may be measured by other suitable techniques (e.g., measuring thermal energy produced).

At step 440, the energy requirements corresponding to processing different elements of source code may be determined. For example, the IDE 142 may determine the energy requirements of line 0060 of source code 200 (illustrated in FIG. 2) based on the energy consumption measured (at step 430) for executing a corresponding portion of executable program 145.

At step 460, the energy requirements determined at step 440 for processing different elements of source code may be included in a stored data structure. For example, the energy index 126 may be generated (or updated) to include data describing the energy requirements of line 0060 of source code 200. After step 460, the method 400 terminates.

In one embodiment, the IDE 142 may allow a developer to set priority flags for defined elements of the source code 200. Such priority flags may specify the relative importance of energy-efficiency and time performance objectives for specified elements of the source code 200. The priority flags may be stored as metadata in the project file 144 or in the development project 124. Further, an indication of the priority flags may be displayed in the IDE 142 along with elements of the source code 200. Such graphical indications may include, e.g., symbols, icons, text labels, color effects, font effects, shading effects, and the like.

Further, the IDE 142 may be configured to compile the source code 200 according to existing priority flags. That is, during a compilation process, the IDE 142 may be configured to select from multiple available options for converting the source code 200 to object code. In one embodiment, the IDE 142 may make such selections based on priority flags set for elements of the source code 200, such that the resulting object code reflects the energy-efficiency and time performance objectives specified by the developer.

Figure 5:
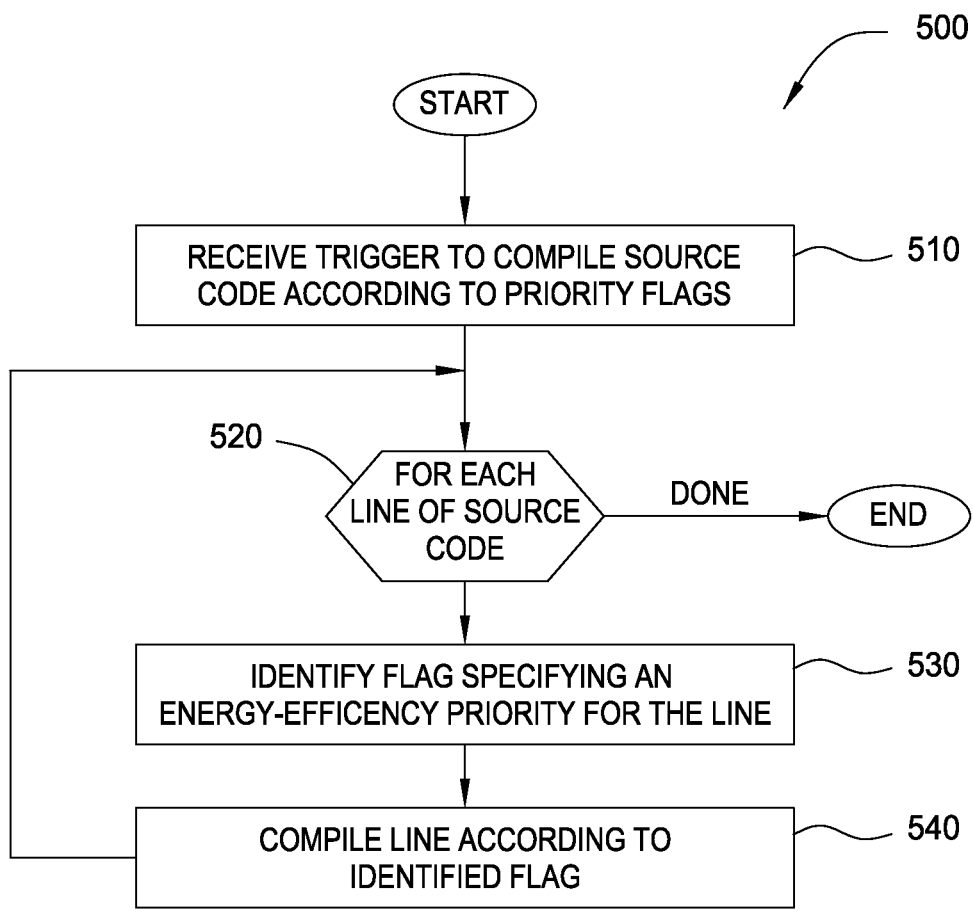
FIG. 5 illustrates a method for compiling source code based on energy-efficiency priority flags, according to one embodiment of the invention.

FIG. 5 illustrates a method 500 for compiling source code based on energy-efficiency priority flags, according to one embodiment of the invention. As shown, the method 500 begins at step 510, where a triggering event to compile source code according to priority flags is received. For example, assume a developer using the IDE 142 illustrated on FIG. 2 compiles the source code 200. Assume also that the developer has previously interacted with the IDE 142 to set priority flags for selected lines source code 200. For example, the developer may interact with an input device 180 (e.g., a mouse) to select the line 0090 of source code 200, and may then select a menu command to set a priority flag for line 0090.

Referring again to FIG. 2, at step 520, the method 500 enters a loop (defined by steps 520, 530, and 540) performed by the compiler to process any priority flags while compiling the source code. At step 530, a flag specifying the energy-efficiency priority of the current line is identified. That is, the flag may indicate whether the priority for compiling the current line should be a time performance objective or an energy-efficiency objective (or some balance in between). For example, at compile time, the IDE 142 may identify a priority flag set by the developer for line 0090 indicating that the assignment of the "rs" variable using the results of executing a database query should be optimized for performance, even at the expense of greater energy requirements.

At step 540, the current line may be compiled according to the identified flag. For example, assume line 0090 of source code 200 can be compiled in two different ways, into executable code with high time performance (i.e., will execute relatively rapidly) or executable code with high energy efficiency (i.e., will require less energy to execute, but will execute more slowly). Assume also that a developer has set a priority flag for line 0090 indicating a roughly equal balance between a time performance objective and an energy-efficiency objective (i.e., 50% speed, 50% energy efficiency). In such a case, when the code is completed, the IDE 142 may direct a compiler to compile line 0090 to produce object code that reflects a roughly equal balance between time performance and energy-efficiency. Once each line of source code has been processed (step 520), the method 500 terminates.

Note that the above example of using priority flags is merely illustrative, and is not intended to be limiting of the invention. Other embodiments are contemplated, and are thus considered to be within the scope of the invention. For example, it is contemplated that priority flags may be set not only for individual lines of source code 200, but also for programmatic levels of source code 200 (e.g., classes, methods, routines, subroutines, functions, etc.).

While the foregoing is directed to embodiments of the present invention, other and further embodiments of the invention may be devised without departing from the basic scope thereof, and the scope thereof is determined by the claims that follow.

What is claimed is:

1. A computer-implemented method for presenting source code of a software application, comprising:
   identifying one or more elements of the source code displayed in an integrated development environment (IDE) tool used by a developer to compose the source code;
   estimating an expected energy requirement for executing each of the one or more elements of the source code by, before executing the one or more elements of the source code, matching the one or more elements of the source code to one of a plurality of records in a predefined index, wherein each record in the predefined index contains an identifier portion and at least one of (i) an expected energy consumed and (ii) an expected thermal energy emitted by one or more components of a computer architecture when executing the matched one of more elements of the source code;
   outputting, before executing the one or more elements of the source code, one or more indications of the estimated energy consumption requirements for display whereby the one or more indications of the estimated energy consumption requirements and the one or more elements of the source code are displayed simultaneously in the IDE tool, and wherein the estimated energy consumption requirements is at least one of the energy consumed and thermal energy emitted by the one or more components;
   executing the one or more elements of the source code;
   measuring actual energy consumed by the one or more components of the computer architecture when executing the one or more elements of the source code; and
   updating the expected energy consumed in one of the plurality of records in the predefined index based on the actual energy consumed.

2. The computer-implemented method of claim 1, wherein the identifier portion in the index comprises at least one of: (i) a source code element, (ii) an object code element, (iii) a unique identifier associated with the one or more elements of source code, (iv) a keyword in the one or more elements of source code, and (v) a functionality performed by the one or more elements of source code.

3. The computer-implemented method of claim 1, wherein each record in the predefined index is based on predefined standards of energy consumption requirements for executing the at least one code element of each of the plurality of records on one or more computer systems.

4. The computer-implemented method of claim 1, wherein each record in the predefined index is based on historical data describing energy consumption measured during prior instances of executing the at least one code element of each of the plurality of records on a target computer architecture.

5. The computer-implemented method of claim 1, wherein the one or more indications comprise at least one of: (i) a highlight effect, (ii) a color effect, (iii) a font effect, (iv) a symbol, and (v) a text label.

6. The computer-implemented method of claim 1, wherein the one or more elements of the source code include at least one of a class, a method, a routine, a subroutine, a function, and an individual line of source code.

7. The computer-implemented method of claim 1, wherein the component of the computer architecture recorded in the predefined index is at least one of:
   a processor, a hard drive, and a cooling fan.

8. The computer implemented method of claim 1, wherein the one or more indications of the estimated energy consumption requirements are outputted for display before the code is executed.

9. The computer implemented method of claim 1, wherein the identifier portion of each record is source code and wherein a value of the expected energy defines the amount of energy required to execute the source code of the identifier portion.

10. A computer-readable storage memory containing a program, which, when executed performs an operation for presenting source code of a software application, the operation comprising:
   identifying one or more elements of the source code displayed in an integrated development environment (IDE) tool used by a developer to compose the source code;
   estimating an expected energy requirement for executing each of the one or more elements of the source code by, before executing the one or more elements of the source code, matching the one or more elements of the source code to one of a plurality of records in a predefined index, wherein each record in the predefined index contains an identifier portion and at least one of (i) an expected energy consumed and (ii) an expected thermal energy emitted by one or more components of a computer architecture when executing the matched one of more elements of the source code;

outputting, before executing the one or more elements of the source code, one or more indications of the estimated energy consumption requirements for display whereby the one or more indications of the estimated energy consumption requirements and the one or more elements of the source code are displayed simultaneously in the IDE tool, and wherein the estimated energy consumption requirements is at least one of the energy consumed and thermal energy emitted by the one or more components;

executing the one or more elements of the source code;

measuring actual energy consumed by the one or more components of the computer architecture when executing the one or more elements of the source code; and updating the expected energy consumed in one of the plurality of records in the predefined index based on the actual energy consumed.

11. The computer-readable storage memory of claim 10, wherein the identifier portion comprises at least one of: (i) a source code element, (ii) an object code element, (iii) a unique identifier associated with the one or more elements of source code, (iv) a keyword in the one or more elements of source code, and (v) a functionality performed by the one or more elements of source code.

12. The computer-readable storage memory of claim 10, wherein each record in the predefined index is based on predefined standards of energy consumption requirements for executing the at least one code element of each of the plurality of records on one or more computer architectures.

13. The computer-readable storage memory of claim 10, wherein each record in the predefined index is based on historical data describing energy consumption measured during prior instances of executing the at least one code element of each of the plurality of records on a target computer architectures.

14. The computer-readable storage memory of claim 10, wherein the one or more indications comprise at least one of: (i) a highlight effect, (ii) a color effect, (iii) a font effect, (iv) a symbol, and (v) a text label.

15. The computer-readable storage memory of claim 10, wherein the identifier portion of each record is source code and wherein a value of the expected energy defines the amount of energy required to execute the source code of the identifier portion.

16. A system, comprising:
a processor; and
a memory containing a program, which when executed on the processor is configured to perform an operation for presenting source code of a software application, the operation comprising:
identifying one or more elements of the source code displayed in an integrated development environment (IDE) tool used by a developer to compose the source code;
estimating an expected energy requirement for executing each of the one or more elements of the source code by, before executing the one or more elements of the source code, matching the one or more elements of the source code to one of a plurality of records in a predefined index, wherein each record in the predefined index: contains an identifier portion and at least one of (i) an expected energy consumed and (ii) an expected thermal energy emitted by one or more components of a computer architecture when executing the matched one of more elements of the source code;
outputting, before executing the one or more elements of the source code, one or more indications of the estimated energy consumption requirements for display whereby the one or more indications of the estimated energy consumption requirements and the one or more elements of the source code are displayed simultaneously in the IDE tool, and wherein the estimated energy consumption requirements is at least one of the energy consumed and thermal energy emitted by the one or more components;
executing the one or more elements of the source code;
measuring actual energy consumed by the one or more components of the computer architecture when executing the one or more elements of the source code;
and
updating the expected energy consumed in one of the plurality of records in the predefined index based on the actual energy consumed.

17. The system of claim 16, wherein the plurality of code elements comprise at least one of: (i) elements of source code, and (ii) elements of object code.

18. The system of claim 16, wherein each record in the predefined index is based on predefined standards of energy consumption requirements for executing the at least one code element of each of the plurality of records a plurality of code elements on one or more computer systems.

19. The system of claim 16, wherein each record in the predefined index is based on historical data describing energy consumption measured during prior instances of executing the at least one code element of each of the plurality of records on a target computer system.

20. The system of claim 16, wherein the identifier portion of each record is source code and wherein a value of the expected energy defines the amount of energy required to execute the source code of the identifier portion.

* * * * *